US011872865B2

(12) United States Patent
Zeretzke et al.

(10) Patent No.: US 11,872,865 B2
(45) Date of Patent: Jan. 16, 2024

(54) MULTI-LINK MOTOR VEHICLE AXLE

(71) Applicant: Dr. Ing. h.c. F. Porsche Aktiengesellschaft, Stuttgart (DE)

(72) Inventors: Stefan Zeretzke, Auma (DE); Stefan Sabath, Sindelfingen (DE); Andreas Munzert, Gerlingen (DE); Marcel Krawietz, Renningen (DE); Jens Kemna, Zaisenhausen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/530,656

(22) Filed: Nov. 19, 2021

(65) Prior Publication Data

US 2022/0219502 A1 Jul. 14, 2022

(30) Foreign Application Priority Data

Jan. 8, 2021 (DE) ..................... 10 2021 100 178.1

(51) Int. Cl.
*B60G 3/20* (2006.01)
*B60G 7/00* (2006.01)

(52) U.S. Cl.
CPC ............. *B60G 3/202* (2013.01); *B60G 7/001* (2013.01); *B60G 2200/182* (2013.01); *B60G 2204/422* (2013.01); *B60G 2206/11* (2013.01)

(58) Field of Classification Search
CPC .. B60G 3/202; B60G 7/001; B60G 2200/182; B60G 2204/422; B60G 2206/11
See application file for complete search history.

(56) References Cited

U.S. PATENT DOCUMENTS

| 4,848,788 A * | 7/1989 | Rumpel ................. B60G 3/202 280/124.144 |
| 5,499,839 A | 3/1996 | Wahl et al. |

(Continued)

FOREIGN PATENT DOCUMENTS

| DE | 102012011864 A1 | 1/2013 |
| DE | 102012110080 A1 * | 4/2014 ............... B60G 3/20 |

(Continued)

OTHER PUBLICATIONS

Munzert, DE-102012110080-A1 English Machine Translation (Year: 2014).*

(Continued)

*Primary Examiner* — Jason D Shanske
*Assistant Examiner* — Matthew James O'Neill
(74) *Attorney, Agent, or Firm* — RatnerPrestia

(57) ABSTRACT

A multi-link motor vehicle axle for the attachment of a wheel carrier to a motor vehicle body. The axle includes a first link plane and a second link plane. A first transverse link and a second transverse link are assigned to the first link plane. The second link plane includes a trapezoidal link which is attached by way of a first coupling link to the wheel carrier and by way of a second coupling link to the motor vehicle body. A longitudinal link of the multi-link motor vehicle axle is formed, which longitudinal link is connected, at its longitudinal link end facing away from the second link plane, to the motor vehicle body. The longitudinal link is attached, by way of its longitudinal link end facing toward the second link plane, to the trapezoidal link.

16 Claims, 4 Drawing Sheets

(56) References Cited

U.S. PATENT DOCUMENTS

| | | | |
|---|---|---|---|
| 7,891,684 B1 | 2/2011 | Luttinen et al. | |
| 8,480,106 B1* | 7/2013 | Cohen ................. | B60G 17/005 |
| | | | 280/5.502 |
| 10,226,977 B2* | 3/2019 | Coppuck ............... | B60G 3/202 |

FOREIGN PATENT DOCUMENTS

| | | |
|---|---|---|
| DE | 102012110080 A1 | 4/2014 |
| DE | 102014112455 A1 | 3/2016 |
| EP | 0655355 A1 | 5/1995 |
| WO | 2013075786 A1 | 5/2013 |
| WO | 2013075787 A1 | 5/2013 |

OTHER PUBLICATIONS

DE102012110080A1, Machine English Translation (Year: 2014).*
DE-102012110080-A1 English machine translation (Year: 2014).*
Great Britain Search Report for Application No. 2200124.2, dated Jun. 29, 2022, 1 page.

* cited by examiner

MULTI-LINK MOTOR VEHICLE AXLE

CROSS-REFERENCE TO RELATED APPLICATION

This application claims priority to German Patent Application No. 10 2021 100 178.1, filed Jan. 8, 2021, the content of such application being incorporated by reference herein in its entirety.

FIELD OF THE INVENTION

The invention relates to a multi-link motor vehicle axle.

BACKGROUND OF THE INVENTION

In a multi-link motor vehicle axle multiple links are arranged in link planes, wherein said links serve to absorb preferably five degrees of freedom of the six degrees of freedom of a body in space. Only one degree of freedom remains for the compression and rebound of the vehicle wheel that is to be held. Such a multi-link motor vehicle axle serves to realize the highest possible level of driving comfort, wherein, furthermore, it is the intention for the motor vehicle to remain in a desired lane in the event of longitudinal forces and lateral forces acting on said motor vehicle.

Multi-link motor vehicle axles have two link planes which are formed in the direction of a motor vehicle vertical axis and which have multiple links which are, in part, coupled to one another, wherein one link plane comprises a so-called trapezoidal link, which emerges for example from the patent specification DE 10 2014 112 455 B4, which is incorporated by reference herein.

EP 0 655 355 B1, which is incorporated by reference herein has disclosed a multi-link motor vehicle axle which is formed in the manner of a so-called MacPherson rear axle, wherein one transverse link is connected to a tension strut.

A multi-link motor vehicle axle which comprises a first and a second link plane, wherein the first link plane has transverse links and the second link plane has a trapezoidal link, emerges from the published patent application DE 10 2012 110 080 A1, which is incorporated by reference herein. A longitudinal link of the multi-link motor vehicle axle is attached at one end to a wheel carrier and at the other end to a motor vehicle body.

SUMMARY OF THE INVENTION

A multi-link motor vehicle axle according to aspects of the invention for the attachment of a wheel carrier to a motor vehicle body comprises a first link plane and a second link plane, wherein a first transverse link and a second transverse link are assigned to the first link plane, and wherein the second link plane comprises a trapezoidal link. The trapezoidal link is attached by means of a first coupling link to the wheel carrier and by means of a second coupling link to the motor vehicle body. A longitudinal link of the multi-link motor vehicle axle is provided, which longitudinal link is connected, at its longitudinal link end facing away from the second link plane, to the motor vehicle body. According to the invention, the longitudinal link is attached, by way of its longitudinal link end facing toward the second link plane, to the trapezoidal link.

A major advantage of the present invention is to be seen in the possibility of omitting subframe mounts, which are commonly received on the ends of a subframe of a chassis frame of the motor vehicle, without eliminating a comfortable longitudinal suspension action that can be achieved with the aid of the invention by means of the links. There is thus the possibility of attaching a chassis frame rigidly to the motor vehicle body, in particular by screw connection, such that the motor vehicle body is stiffened and the motor vehicle body thus exhibits improved rear-end stiffness without causing unacceptable self-steering behavior of wheels arranged on the multi-link motor vehicle axle.

Furthermore, the multi-link motor vehicle axle according to aspects of the invention offers the possibility of a structural-space-optimized arrangement of a load-bearing spring and of a damper, which are commonly arranged in the form of a spring strut. With the aid of the attachment of the longitudinal link to the trapezoidal link, the load-bearing spring and the damper can be arranged separately from one another in a manner optimized in terms of structural space, resulting in a so-called packaging advantage in the arrangement of a large-volume electric machine, which in particular extends predominantly in the direction of a motor vehicle transverse axis, as a drive assembly or additional drive assembly. An elimination of the subframe mount on the subframe offers the possibility of arranging the electric machine on or at the chassis frame, whereby the production, arrangement and stiffness of the attachment of the electric machine can be significantly improved.

A further possibility is an attachment of the damper to the trapezoidal link with an arrangement which is situated at as low a level as possible in the direction of a motor vehicle vertical axis, in order that, with a corresponding damper rate, an end of the damper which faces toward the motor vehicle body can be situated at a correspondingly low level in order to realize a further arrangement advantage, such that, in the case of a deflected wheel, that end of the damper which is formed with a supporting mount and which faces toward the motor vehicle body is situated no longer adjacent to an inner wheel flank, as is the case in the prior art, but below the inner wheel flank as viewed in the direction of the motor vehicle vertical axis. It is thus possible for an extent of the chassis, and likewise an extent of the motor vehicle body, in the direction of a body transverse axis to be reduced.

The longitudinal link is connected, at an attachment element, to the trapezoidal link in order that a reliable movable attachment of the longitudinal link to the trapezoidal link is realized. The attachment element may be designed for example in the form of a web, or it may be configured in the form of a recess formed in the trapezoidal element.

Depending on a desired function of the longitudinal link, said longitudinal link or the attachment element is attached or formed behind the wheel axis as viewed in the direction of a motor vehicle longitudinal axis in a direction of travel, in order to realize a compression strut, or in front of the wheel axis as viewed in the direction of a motor vehicle longitudinal axis in a direction of travel, in order to realize a tension strut.

In a further embodiment of the multi-link motor vehicle axle according to the invention, the longitudinal link is arranged on the trapezoidal link in a manner pivotable about an element axis of the attachment element, wherein the element axis is formed orthogonally with respect to a longitudinal axis of the longitudinal link in order that an assured movement and transmission of forces to the longitudinal link are possible.

A reliably comfortable multi-link motor vehicle axle is realized if the longitudinal link has, at one or at both ends, mounts which have a function of a comfort mount.

At least one of the two transverse links is advantageously formed in the manner of an active tie rod.

The arrangement of the load-bearing spring and of the damper substantially in the direction of a motor vehicle longitudinal axis relative to one another leads to a possible reduction of an extent of the chassis and likewise of the motor vehicle body in the direction of the body transverse axis, in a simple and thus inexpensive manner.

By means of the attachment of the longitudinal link to the trapezoidal link, the transverse links can be arranged substantially parallel, whereby it is made possible to omit the subframe mounts without a reduction in comfort owing to an admissible pivoting movement of the multi-link motor vehicle axle.

For support of the braking moments with simultaneously assured pivoting, the first coupling link and the second coupling link respectively engage on a side of the trapezoidal link which faces toward the wheel carrier and on a side of the trapezoidal link which faces away from the wheel carrier.

BRIEF DESCRIPTION OF THE DRAWINGS

Further advantages, features and details of the invention will emerge from the following description of preferred exemplary embodiments and from the drawing. The features and feature combinations mentioned above in the description and the features and feature combinations mentioned below in the description of the figures and/or shown in the figures alone are able to be used not only in the respectively specified combination but also in other combinations or individually without departing from the scope of the invention. Identical or functionally identical elements are denoted by identical reference signs. In the drawing.

DETAILED DESCRIPTION OF THE INVENTION

Figure 1:
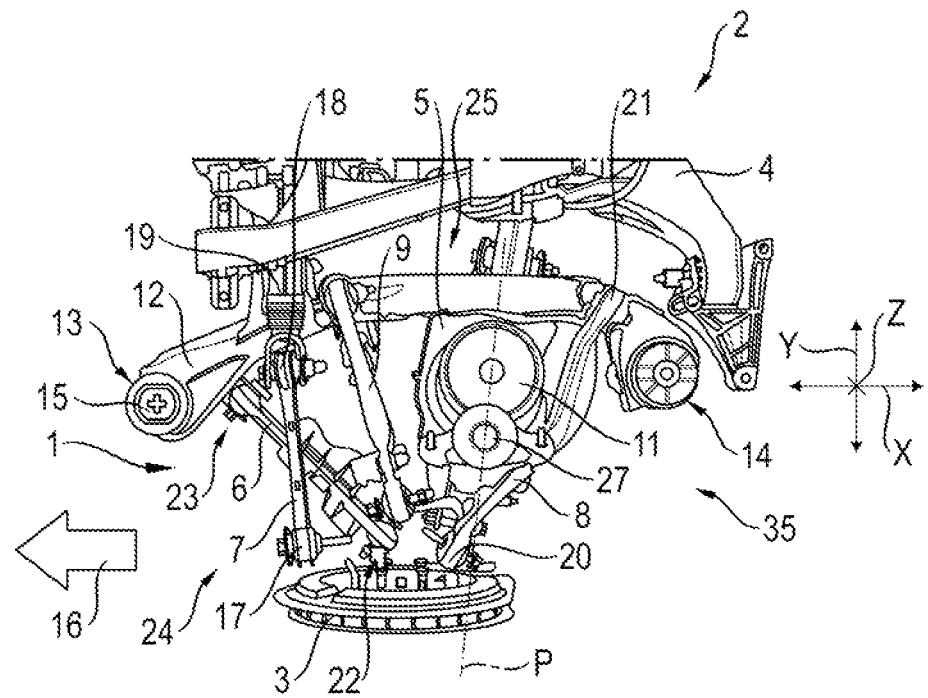
FIG. 1 shows a detail of a multi-link motor vehicle axle according to the prior art in a perspective plan view.

A multi-link motor vehicle axle 1 according to the prior art, which is designed for use in a motor vehicle 2, is constructed as shown in FIG. 1. A direction of travel 16 is indicated with the aid of a direction arrow. The multi-link motor vehicle axle 1 is connected to a wheel carrier 3 of a chassis 35 of the motor vehicle 2. The chassis 35 is attached to a motor vehicle body 4 of the motor vehicle 2.

The multi-link motor vehicle axle 1, which is designed as a rear axle, comprises a trapezoidal link 5, a longitudinal link 6, a first transverse link 7 and a second transverse link 8, and a first coupling link 9 and a second coupling link 10. A load-bearing spring 11 is arranged so as to extend between the two transverse links 7, 8. The second transverse link 8 and the first coupling link 9 are connected to a subframe 12 which, at its ends, a first axial end 13 and a second axial end 14, has a respective elastic damper element 15 for the purposes of driving comfort, wherein the damper element 15 commonly has a rubber insert for shock absorption.

Arranged between the load-bearing spring 11 and the wheel carrier 3 is a damper 27, which is thus positioned in the direction of a body transverse axis Y of the motor vehicle body 4 relative to the load-bearing spring 11, giving rise to a corresponding width of the motor vehicle body 4 and of the chassis 35. For improved understanding, a Cartesian coordinate system is shown which has extent directions of axes of the motor vehicle body 4, a body longitudinal axis X, the body transverse axis Y and a body vertical axis Z.

The first transverse link 7 is, at its first link axial end 17 facing toward the wheel carrier 3, coupled directly to the wheel carrier 3. At its second link axial end 18, the first transverse link 7 is connected to an activator 19 in order to realize a so-called active tie rod. It would likewise also be possible for said first transverse link to be attached at its second link axial end 18 to the body 4, without the implementation of an active tie rod.

The second transverse link 8, at its third link axial end 20 facing toward the wheel carrier 3, is likewise received directly on the wheel carrier 3 and, at its fourth link axial end 21 facing away from the third link axial end 20, is connected directly or indirectly to the motor vehicle body 4.

The first coupling link 9 and the second coupling link 10 serve for the attachment of the trapezoidal link 5 respectively to the wheel carrier 3 and to the motor vehicle body 4.

Furthermore, the wheel carrier 3 is attached to the motor vehicle body 4 by means of a longitudinal link 6 which, at its first longitudinal link end 22, is directly articulated on the wheel carrier 3 and, at its second longitudinal link end 23 facing away from the first longitudinal link end 22, is directly articulated on the motor vehicle body 4. Said longitudinal link 6 is thus arranged between a first link plane 24 of the multi-link motor vehicle axle 1 and a second link plane 25 of the multi-link motor vehicle axle 1, wherein said longitudinal link is positioned between the transverse links 7, 8, which form the first link plane 24, and the trapezoidal link 5, which forms the second link plane 25. The longitudinal link 6, which serves in particular for accommodating longitudinal forces, is designed to extend approximately from a center of the wheel carrier 3 obliquely in the direction of the direction of travel 16.

It is self-evident that the links 5, 6, 7, 8, 9, 10 are connected movably with respect to one another in accordance with their attachments.

Figure 2:
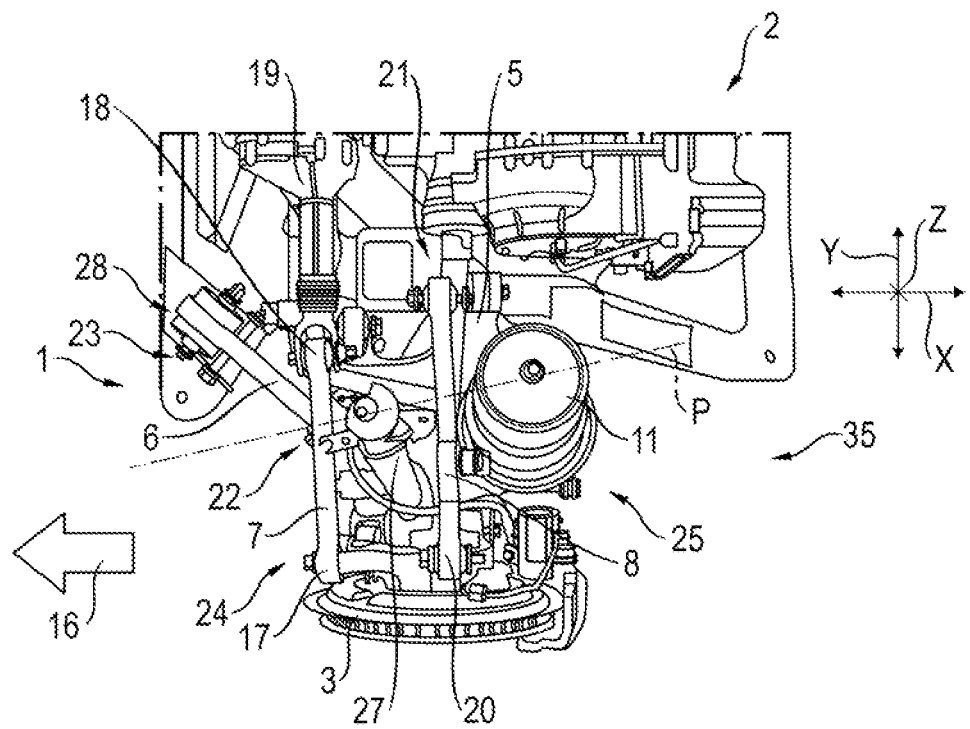
FIG. 2 shows a detail of a multi-link motor vehicle axle according to aspects of the invention in a first exemplary embodiment in a perspective plan view.
Figure 3:
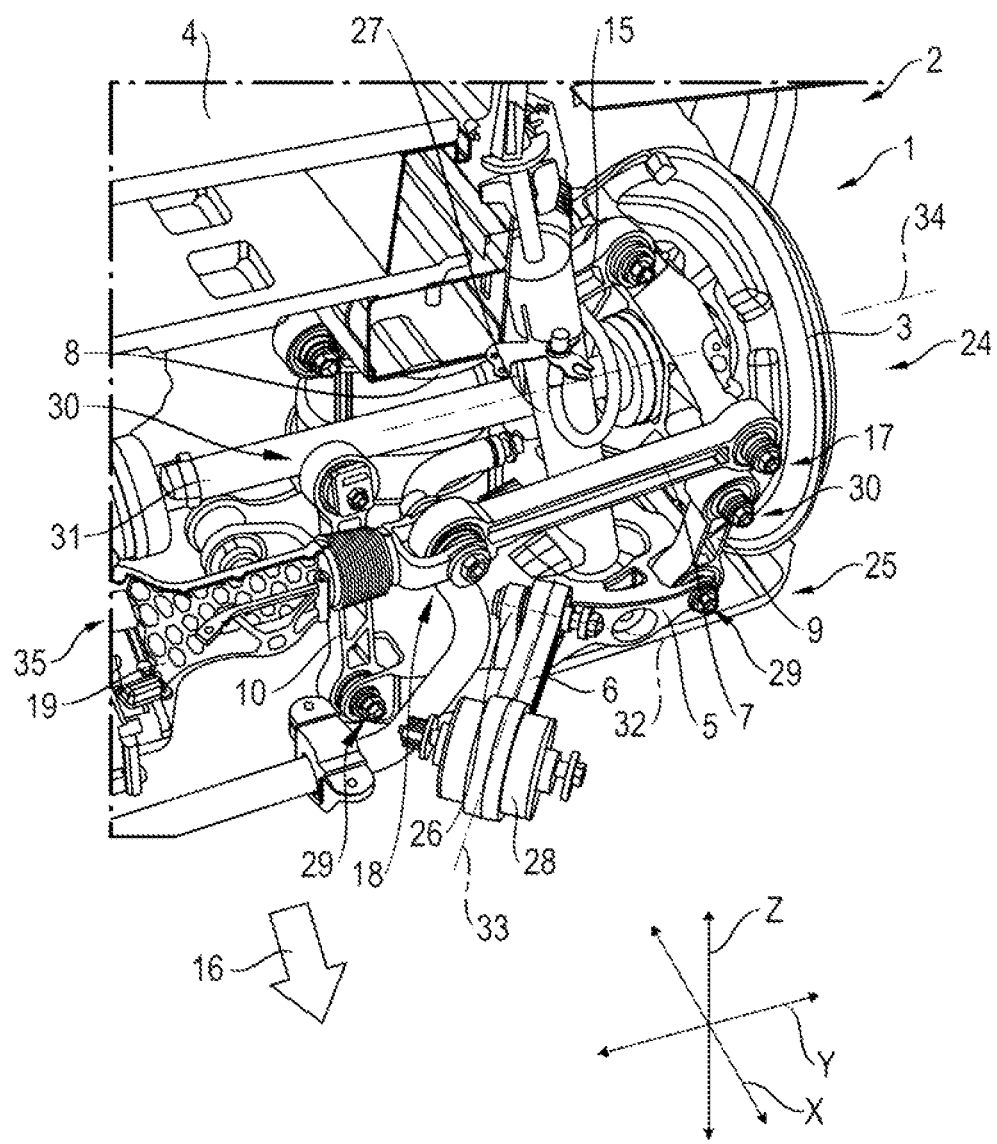
FIG. 3 shows a detail of the multi-link motor vehicle axle as per FIG. 2 in a further perspective view.
Figure 4:
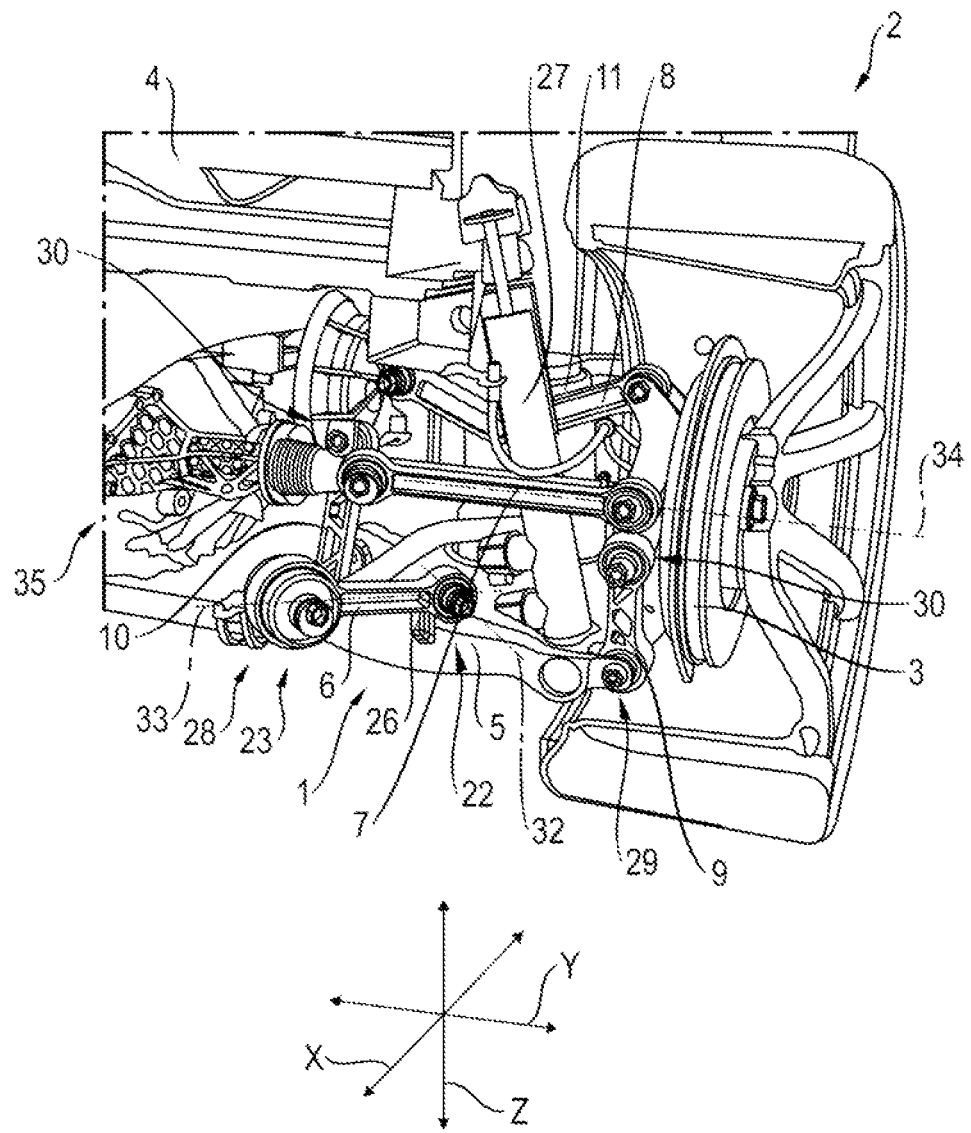
FIG. 4 shows a detail of the multi-link motor vehicle axle as per FIG. 2 in a perspective view.

A multi-link motor vehicle axle 1 according to aspects of the invention which is designed for use in a motor vehicle is, in a first exemplary embodiment, constructed as shown in FIGS. 2 to 4. By contrast to the longitudinal link 6 of the multi-link motor vehicle axle 1 as per FIG. 1, the longitudinal link 6 is connected, at its first longitudinal link end 22 facing toward the wheel carrier 3, to the trapezoidal link 5.

In the first exemplary embodiment, the first longitudinal link end 22 is connected, at an attachment element 26, to the trapezoidal link 5 which, as viewed in the direction of the direction of travel 16, is situated, as it were, in front of a wheel axis 34 of the wheel carrier 3, wherein the longitudinal link 6 has the function of a tension strut.

Figure 5:
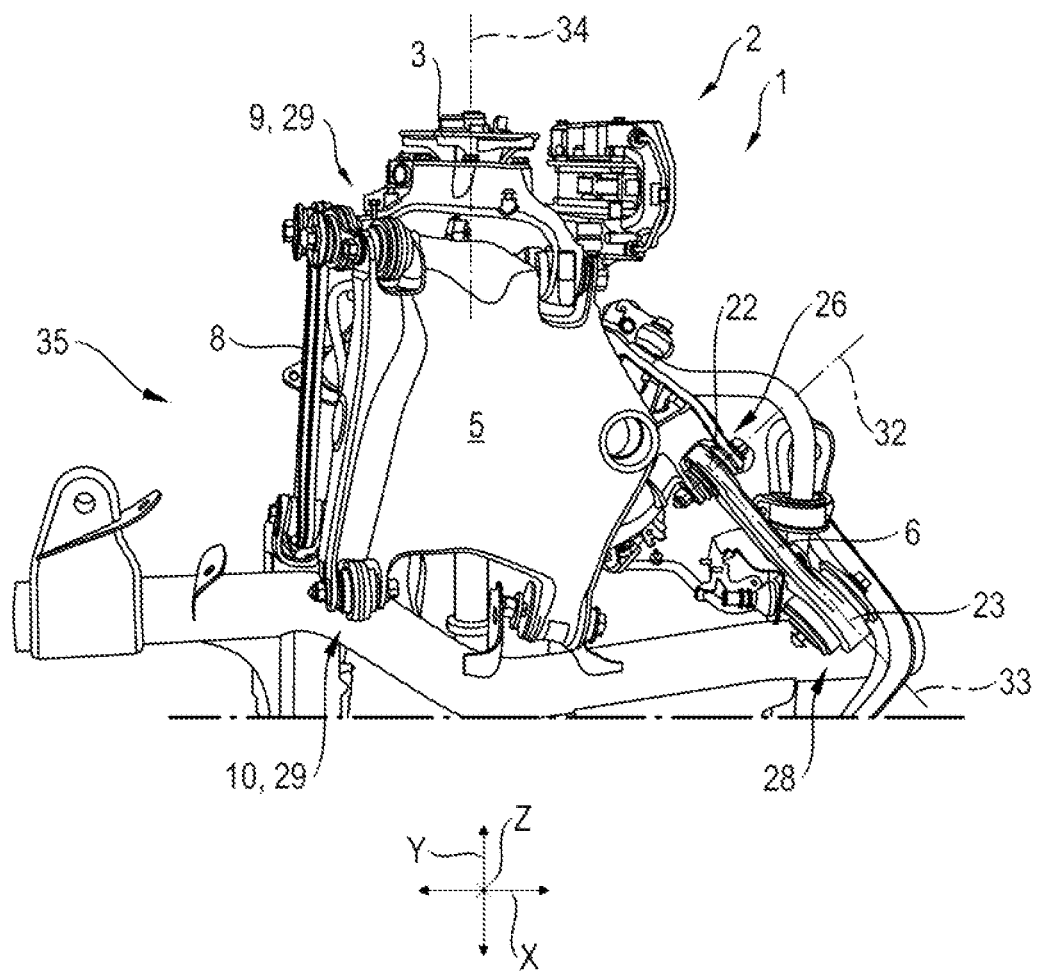
FIG. 5 shows a detail of the multi-link motor vehicle axle according to aspects of the invention in a second exemplary embodiment in a perspective view.

In a second exemplary embodiment of the multi-link motor vehicle axle 1 according to aspects of the invention as shown in FIG. 5, the attachment element 26 is formed, as it were, behind the wheel axis 34 in the direction of the direction of travel 16, whereby the longitudinal link 6 performs the function of a compression strut. It is self-evidently the case in both exemplary embodiments that the longitudinal link 6 is received movably on the attachment element 26. This means, in other words, that the trapezoidal link 5 and the longitudinal link 6 are connected so as to be movable relative to one another.

The longitudinal link 6 is received on the attachment element 26 which is formed on the trapezoidal link 5, wherein the attachment element 26 has an element axis 32, with the longitudinal link 6 being arranged on the attachment element 26 so as to be pivotable about said element axis, wherein the element axis 32 is formed orthogonally with respect to a longitudinal axis 33 of the longitudinal link 6. A pivoting, or in other words a tilting, of the multi-link motor vehicle axle 1 for the purposes of accommodating forces in the direction of the motor vehicle longitudinal axis X is thus possible, such that an attachment of the damper element 15 to the axial ends 13, 14 of the subframe 12 can be omitted.

The trapezoidal link 5 is formed in the manner of a multifunctional component which, in addition to its transverse link function, serves for the mounting of the load-bearing spring 11 and of the damper 27.

A so-called subframe mount which the multi-link motor vehicle axle 1 as per FIG. 1, that is to say according to the prior art, has at each of the axial ends 13, 14 can be omitted at the axial ends 13, 14 because, owing to the attachment of the longitudinal link 6 to the trapezoidal link 5, a functionally corresponding mount 28 is formed at the second longitudinal link end 23. A central axle 31 of the multi-link motor vehicle axle 1 is shown in FIG. 3.

In the illustrated exemplary embodiments of the multi-link motor vehicle axle 1 according to the invention, the two coupling links 9 and 10 are attached by way of their first articulation points 29 in each case to the same side of the trapezoidal link 20. This means, in other words, that the two coupling links 9, 10 are movably connected, at their end facing toward the trapezoidal link 5, to the trapezoidal link 9, 10, wherein the first coupling link 9 is attached to an end of the trapezoidal link 5 facing toward the wheel carrier 3 and the second coupling link 10 is attached to an end of the trapezoidal link 5 facing away from the wheel carrier 3.

A second articulation point 30, facing away from the first articulation point 29, of the first coupling link 9 is connected to the wheel carrier 3, whereas the second articulation point 30 of the second coupling link 10 is attached to the motor vehicle body 4. It would likewise be possible for the two coupling links 9, 10 to be attached by way of their first articulation points 29 in a diagonally offset manner to the trapezoidal link 20, for example such that one of the coupling links 9; 10 is attached to that side of the trapezoidal link 5 which faces toward the wheel carrier 3 and the other of the coupling links 10; 9 is attached to that side of the trapezoidal link 5 which faces away from the wheel carrier 3.

The multi-link motor vehicle axle 1 according to aspects of the invention exhibits behavior in accordance with a so-called five-link motor vehicle axle. The trapezoidal link 5 of the second link plane 25 is attached both directly by way of articulation points, and indirectly by way of the two coupling links 9, 10, both to the wheel carrier 3 and to the motor vehicle body 4. The two coupling links 9, 10 serve in particular for supporting braking moments. Kinematic and elastokinematic parameters can be set individually or separately.

By means of the multi-link motor vehicle axle 1 according to the invention, it is possible to realize a motor vehicle 2 which is shorter in the direction of the motor vehicle transverse axis Y than is possible with the multi-link motor vehicle axle 1 designed as per FIG. 1, because positioning of the load-bearing spring 11 and of the damper 27 substantially in the direction of the motor vehicle longitudinal axis X is made possible, as can be seen from a comparison of the positioning axis P shown in FIGS. 1 and 2. It is also made possible for the two transverse links 7, 8 to be arranged substantially parallel to one another, whereby the pivoting of the multi-link motor vehicle axle 1 can be realized.

What is claimed is:

1. A multi-link motor vehicle axle for the attachment of a wheel carrier to a motor vehicle body, said multi-link motor vehicle axle comprising:
   a first link plane and a second link plane,
   a first transverse link and a second transverse link each assigned to the first link plane,
   a trapezoidal link assigned to the second link plane and which is attached by way of a first coupling link to the wheel carrier and by way of a second coupling link to the motor vehicle body, wherein the first coupling link includes a first end that is pivotably coupled to the wheel carrier and a second end that is pivotably coupled to the trapezoidal link at a first connection point, and wherein the second coupling link includes a first end that is pivotably coupled to the trapezoidal link at a second connection point and a second end that is configured to be attached to the motor vehicle body, and
   a longitudinal link having (i) a first longitudinal link end that faces away from the second link plane and is configured to be connected to the motor vehicle body, and (ii) a second longitudinal link end that faces toward the second link plane and is attached to the trapezoidal link,
   wherein the longitudinal link is mounted to the trapezoidal link at a location between the first and second connection points on the trapezoidal link,
   wherein the longitudinal link is connected, at an attachment element, to the trapezoidal link, and
   wherein the attachment element is at least partially positioned on a top surface of the trapezoidal link.

2. The multi-link motor vehicle axle as claimed in claim 1, wherein the longitudinal link is attached behind a wheel axis or in front of the wheel axis as viewed in a direction of a motor vehicle longitudinal axis (X) in a direction of travel.

3. The multi-link motor vehicle axle as claimed in claim 1, wherein the longitudinal link is arranged on the trapezoidal link in a manner pivotable about an element axis of the attachment element, wherein the element axis is formed orthogonally with respect to a longitudinal axis of the longitudinal link.

4. The multi-link motor vehicle axle as claimed in claim 1, wherein the longitudinal link has, at one of the longitudinal link ends, a mount which has a function of a comfort mount.

5. The multi-link motor vehicle axle as claimed in claim 1, wherein one of the two transverse links is an active tie rod.

6. The multi-link motor vehicle axle as claimed in claim 1, further comprising a load-bearing spring and a damper of the motor vehicle body, which are arranged substantially in a direction of a motor vehicle longitudinal axis (X) relative to one another.

7. The multi-link motor vehicle axle as claimed in claim 1, wherein the two transverse links are arranged substantially parallel.

8. The multi-link motor vehicle axle as claimed in claim 1, wherein the first coupling link and the second coupling link respectively engage on a side of the trapezoidal link which faces toward the wheel carrier and on a side of the trapezoidal link which faces away from the wheel carrier.

9. The multi-link motor vehicle axle as claimed in claim 1, wherein the second longitudinal link end is directly connected to the trapezoidal link.

10. The multi-link motor vehicle axle as claimed in claim 1, wherein the second longitudinal link end is not directly connected to the wheel carrier.

11. The multi-link motor vehicle axle as claimed in claim 1, wherein the second longitudinal link end is positioned further from the wheel carrier than the first coupling link.

12. The multi-link motor vehicle axle as claimed in claim 1, wherein the longitudinal link is configured to pivot relative to the attachment element about an element axis.

13. The multi-link motor vehicle axle as claimed in claim 12, wherein the element axis is oriented obliquely relative to a longitudinal axis of the wheel carrier.

14. The multi-link motor vehicle axle as claimed in claim 12, wherein the element axis is oriented orthogonally relative to a longitudinal axis of the longitudinal link.

15. The multi-link motor vehicle axle as claimed in claim 12, wherein the element axis is oriented (i) obliquely relative to a longitudinal axis of the wheel carrier, and (ii) orthogonally relative to a longitudinal axis of the longitudinal link.

16. A multi-link motor vehicle axle for the attachment of a wheel carrier to a motor vehicle body, said multi-link motor vehicle axle comprising:
   a first link plane and a second link plane,
   a first transverse link and a second transverse link each assigned to the first link plane,
   a trapezoidal link assigned to the second link plane and which is attached by way of a first coupling link to the wheel carrier and by way of a second coupling link to the motor vehicle body, wherein the first coupling link includes a first end that is pivotably coupled to the wheel carrier and a second end that is pivotably coupled to the trapezoidal link at a first connection point, and wherein the second coupling link includes a first end that is pivotably coupled to the trapezoidal link at a second connection point and a second end that is configured to be attached to the motor vehicle body, and
   a longitudinal link having (i) a first longitudinal link end that faces away from the second link plane and is configured to be connected to the motor vehicle body, and (ii) a second longitudinal link end that faces toward the second link plane and is attached to the trapezoidal link,
   wherein the longitudinal link is mounted to the trapezoidal link at a location between the first and second connection points on the trapezoidal link,
   wherein the second longitudinal link end is directly connected to the trapezoidal link, and wherein the second longitudinal link end is not directly connected to the wheel carrier.

* * * * *